United States Patent Office 2,809,707
Patented Oct. 15, 1957

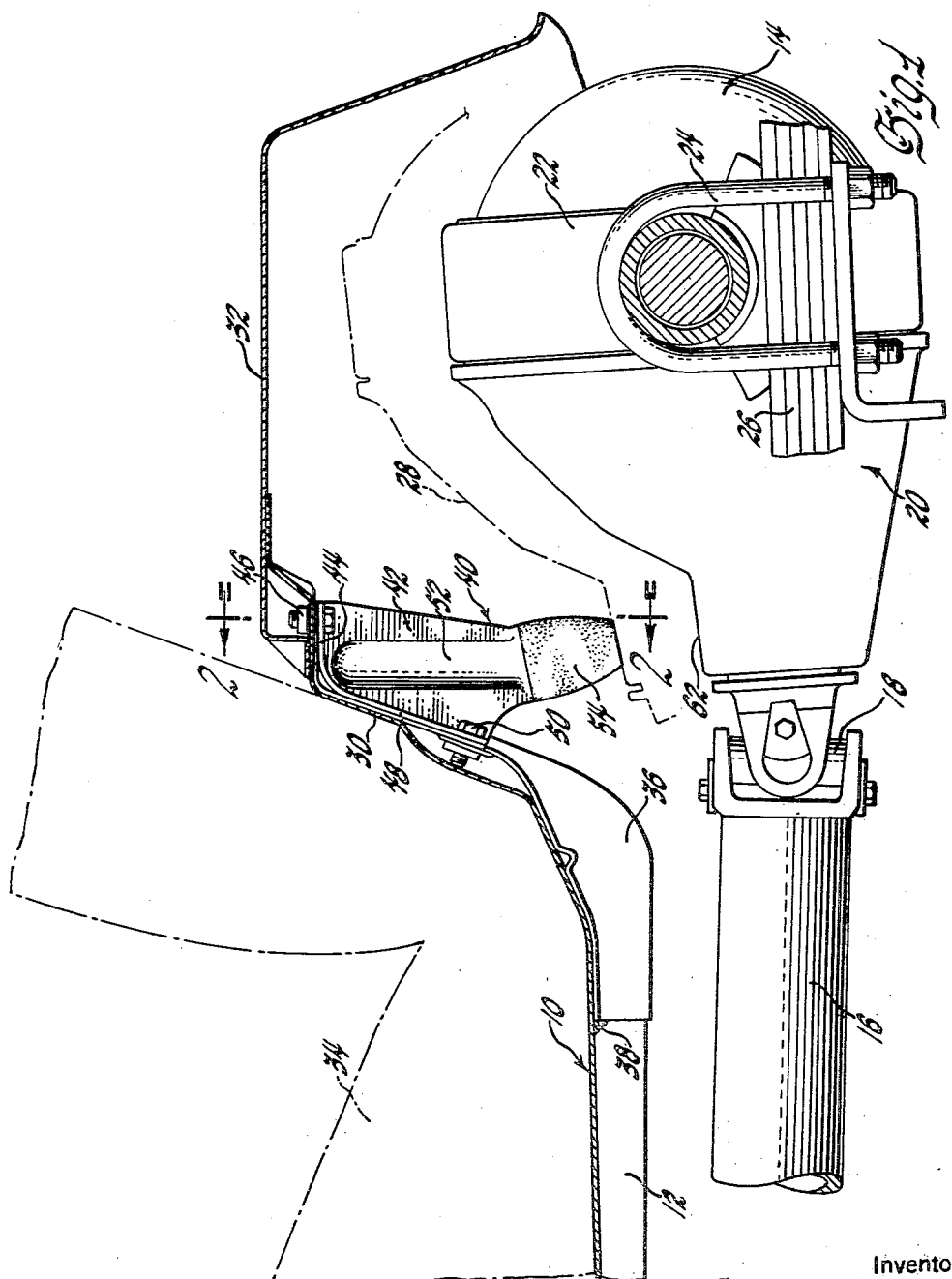

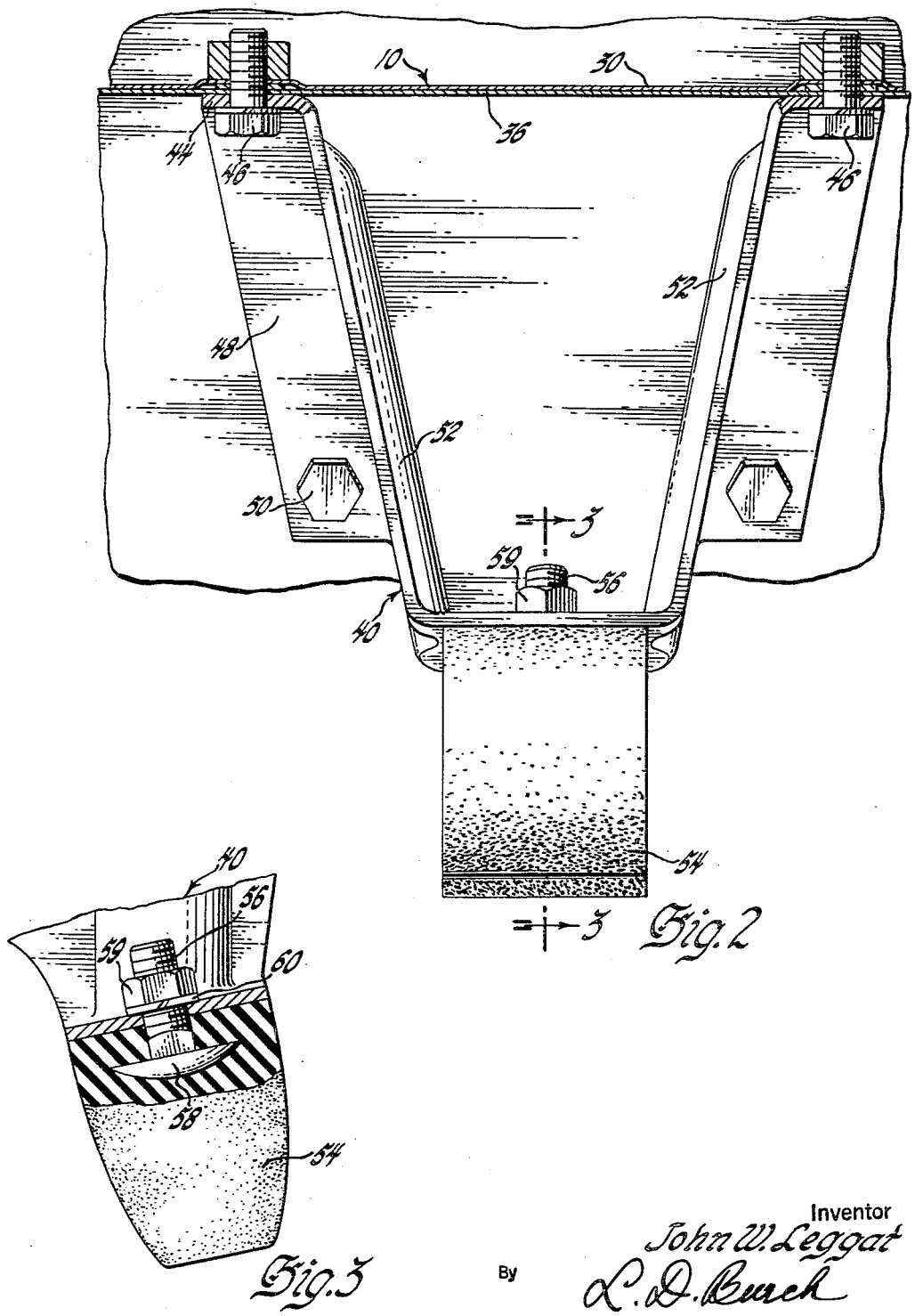

2,809,707

MEANS PERMITTING LOWER AND UNOBSTRUCTIVE VEHICLE FLOOR CONSTRUCTION

John W. Leggat, Detroit, Mich., assignor to General Motors Corporation, Detroit, Mich., a corporation of Delaware Application September 27, 1954, Serial No. 458,633

4 Claims. (Cl. 180—73)

This invention relates generally to automotive vehicles and more particularly to means for lowering the floor level of a vehicle body without interfering with the drive means disposed thereunder.

Most automotive vehicles have drive means extended under the floor of the vehicle body. The height of such drive means is generally determined by road clearance, wheel size and other factors. It has been common in the past in lowering the level of a vehicle body floor to form a tunnel in the floor to accommodate the drive means. The tunnel or hump formed in the passenger compartment of the vehicle body is most objectionable. It is therefore desirable to reduce the height of such tunnel or hump in the passenger compartment as much as possible while still providing a lower vehicle floor and to do such without interference between the drive means and the vehicle floor.

It is now proposed to provide a means for lowering the floor level of a vehicle body and for reducing the obstruction within the passenger compartment of such body. The means proposed include a bumper stop or member secured to the floor pan of the vehicle body in the location of the rear seat kick-up. The bumper stop is extended downwardly and is adapted to limit upward travel of the drive means. In limiting the upward travel of the drive means by means disposed other than within the tunnel itself, a greater reduction in tunnel height within the passenger car compartment is possible with a lower floor level and without interference therebetween.

In the drawings:

Figure 1 is a side elevational view of a part of an automotive vehicle having the present invention embodied therein.

Figure 2 is an end view of the bumper stop or member of the proposed invention as viewed in the plane of line 2—2 of Figure 1 taken in the direction of the arrows thereon.

Figure 3 is a partially cross-sectioned view of the bumper stop taken substantially in the plane of line 3—3 of Figure 2 and viewed in the direction of the arrows thereon.

The under portion, pan or floor 10 of a vehicle body is formed in a conventional and well-known manner to provide a channeled portion or tunnel 12 to accommodate drive means 14 disposed under the vehicle body. Such drive means 14 include a driveshaft 16 connected by universal means 18 to a differential carrier or housing 20. The differential housing 20 is mounted within an axle housing 22 secured by tie rods 24 to the vehicle springs 26. Normal deflection of the vehicle springs 26 causes the differential housing 20 to be moved from the solid line position shown in Figure 1 to that of the phantom outline as indicated by numeral 28 which in turn moves the driveshaft 16 upwardly within the tunnel 12 formed in the vehicle floor 10. Heretofore, it has been necessary to provide a tunnel of considerable height within the vehicle floor to accommodate the driveshaft and to prevent such shaft from engaging the vehicle floor. Since the driveshaft is continually rotating when the vehicle is in operation it is impractical to provide any limit means which will engage the driveshaft. Furthermore, any stop or limit means disposed within the driveshaft tunnel would require a greater clearance in such tunnel to accommodate the stop means which is the very thing sought to be avoided.

In the present instance, the vehicle floor 10 is formed upwardly near one end 30 thereof over the differential housing 20 and axle housing 22 and has a floor extension member 32 secured to such upwardly inclined end. The upwardly inclined end 30 of the vehicle floor 10 with the extension member 32 form what is commonly called the seat kick-up. The passenger seat 34 is disposed just forward of such kick-up. A brace or strengthening member 36 is secured to the vehicle floor 10 as by welding 38 at the forward end of the kick-up and partially within the driveshaft tunnel 12 to provide greater structural strength within this portion of the vehicle floor.

Bumper stop means 40 are secured to the brace 36 and vehicle floor 10 at the forward end of the kick-up. The bumper stop means 40 include a depending U-shaped bracket 42 having flanges 44 at the top through which bolt means 46 are extended to secure one end of the bracket to the vehicle floor 10. The bracket 42 also includes depending side flanges 48 through which other bolt means 50 are extended to more firmly secure the bracket to the vehicle floor 10. The depending side portions of the U-shaped bracket 42 are formed with ribs 52 to provide greater structural strength. A substantially frusto-conical bumper element 54 of rubber or other yieldable cushioning material is secured to the lower-most end of the U-shaped bracket by fastening means 56 including a threaded bolt 58 imbedded in one end of the bumper element 54 and secured by a nut 59 and lock washer 60 to the end of the bracket.

The bumper stop means 40 as secured to the vehicle floor 10 at the end 30 of the vehicle floor within the kick-up extends outwardly and down to dispose the bumper element 54 in a position adapted to engage and limit the upward travel of the differential housing 20 by engagement with the forward end 62 thereof. As shown in Figure 1 upward deflection of the housing 20 brings the forward end 62 thereof in contact with the bumper element 54. Figure 1 shows the initial contact between the differential housing 20 and the bumper element 54. It will be appreciated that the bumper element 54 may be further compressed allowing further limited upward travel of the differential housing 20 and of the driveshaft 16 connected thereto. The clearance between the driveshaft 16 and the vehicle floor 10 within the driveshaft tunnel 12 may, therefore, be reduced to a minimum.

With the foregoing description in mind, it is obvious that with a given floor level the height of the driveshaft tunnel within the passenger compartment of a vehicle body may be reduced by the use of the bumper stop means in the manner proposed. It should also be apparent that where the height of the driveshaft tunnel within the passenger compartment is found not too objectionable, such height may be maintained and the vehicle floor level lowered by use of the bumper stop means in the manner here proposed. Obviously, between these two extreme conditions it is possible to lower both the height of the driveshaft tunnel and the level of the vehicle floor though both a lesser amount. The bumper stop means in all instances is adapted to prevent the engagement of the vehicle drive means extended under the vehicle body with the floor thereof.

The claims:

1. In a vehicle having a vehicle body disposed over vehicle drive means including a differential housing, a vehicle floor formed to provide a tunnel receiving said drive means, said vehicle floor being inclined upwardly near one end thereof to accommodate said differential housing, and a bumper stop member secured to said vehicle floor near said one end thereof and extended outwardly and down for engagement with said differential housing, said bumper stop member engaging said differential housing for limiting upward travel of said drive means within said tunnel and for preventing the engagement of said drive means with said vehicle floor.

2. In a vehicle having a vehicle floor pan, a drive shaft tunnel formed within said floor pan, and vehicle drive means disposed within said tunnel and including a drive shaft member having a differential drive housing member connected to the rearwardly disposed end thereof, said floor pan being formed upwardly at an inclined angle over said differential housing, and bumper stop means secured to the inclined portion of said floor pan and extended downwardly over the forwardly extended end of said differential housing for limiting upward movement of said housing relative to said floor pan and of said drive shaft connected thereto relative to said drive shaft tunnel.

3. A vehicle body including a vehicle floor pan having a drive shaft tunnel formed therein and vehicle drive means disposed within said tunnel, a differential housing member connected to the rearwardly disposed end of said drive shaft member, said floor pan being formed upwardly at an inclined angle over the forwardly extended end of said differential housing, and bumper stop means secured to the inclined portion of said floor pan centrally thereof and including a support bracket having one end thereof disposed downwardly over the forwardly extended end of said differential housing and a resilient bumper pad secured to the end of said bracket for engaging and restraining upward movement of said differential housing and thereby limiting upward movement of said drive shaft to allow a more shallow drive shaft tunnel to be provided within said floor pan than would otherwise be required.

4. A vehicle body including a floor pan having a drive shaft tunnel formed therein, a vehicle drive shaft received within said tunnel, a differential drive member connected to the end of said drive shaft, said floor pan having a part thereof formed upwardly and over said differential drive member, and bumper stop means secured to said part of said floor pan centrally thereof and over the forwardly extended end of said differential drive member, said bumper stop means including a bracket having flanges secured within a corner of said part of said floor pan extended upwardly and over said differential housing and being extended downwardly toward said differential drive member, and a bumper pad secured to the downwardly extended end of said bracket for engaging and limiting upward movement of said differential drive member relative to said floor pan part and of said drive shaft connected thereto relative to said drive shaft tunnel.

References Cited in the file of this patent
UNITED STATES PATENTS

| 2,126,607 | Boehner | Aug. 9, 1938 |
| 2,373,356 | Thoms et al. | Apr. 10, 1945 |
| 2,631,682 | Gale | Mar. 17, 1953 |